May 8, 1934. T. R. SCOTT 1,958,281
ELECTRIC CABLE
Filed May 20, 1930
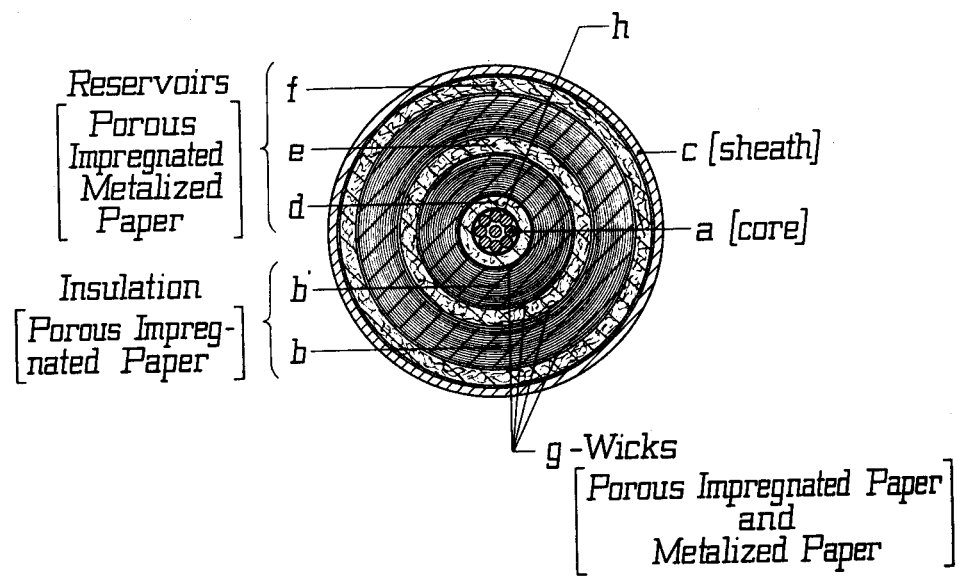
INVENTOR
T. R. Scott
BY
ATTORNEY Patented May 8, 1934

1,958,281

UNITED STATES PATENT OFFICE 1,958,281

ELECTRIC CABLE

Thomas Robertson Scott, Aldwych, London, England, assignor to International Standard Electric Corporation, New York, N. Y.

Application May 20, 1930, Serial No. 454,149
In Great Britain September 25, 1929

5 Claims. (Cl. 173—266)

This invention relates to high voltage cables.

In high tension cables at very high potentials, it is necessary whatever the thickness of insulation employed, to bring the conductor diameter up to a certain value in order that the maximum stress (at its surface) may not exceed a safe value. In general it is not economical to build up to this diameter by increasing the copper section and it is usual therefore to make the conductor in the form of concentric layers of wire built round a supporting medium. Thus in the hollow core cable the medium may be a spiral spring and in other types of cable the central medium may be composed of jute or paper.

The present invention provides a modified form of cable which overcomes the said difficulty in a novel manner, one form of which is set forth in the accompanying drawing.

According to the present invention the effective diameter of the core of the cable is increased by assembling about the core a metallized layer preferably in the form of a metallized paper tape which is at the same potential as the core. The metallized layer is preferably in the form of a capillary reservoir $d$ so that in addition to building up the diameter of core it provides a reservoir for the impregnating medium in direct contact with the active insulation. "Wicks" may be utilized to connect the reservoir to the active insulation through the convolutions of the metallized paper which would form the boundaries $g$ between the reservoirs and the active insulation. The "wicks" for example may consist of porous material applied in an open helix over a metallized surface or "intersheath" and an electrically conductive material may be placed in the space between the adjacent turns of the helix to make contact between the "intersheath" and metallized surface laid on the outside of the helix. Such "wicks" are shown and described in Patent No. 1,947,676 granted to T. R. Scott and N. A. Allen on February 20, 1934. The boundary $h$ between the reservoir $d$ and the copper conductor $a$ may be formed of a folded metallized paper tape, which would be folded so that a metallized surface was presented on both sides thereof to be in contact with the core on one side and the reservoir on the other.

On the outside of the said reservoir the main dielectric $b'$, usually of paper, is applied and surrounding this a second layer of metallized paper forming a second reservoir $e$ may be provided. Immediately surrounding the outer reservoir the lead sheath $c$ may be situated.

Under varying conditions of temperature, the impregnating oil contained in the main dielectric may expand outwardly into the outside reservoir and inwardly into the inner reservoir, the relative porosity of the material of the reservoirs and of the main insulation being chosen according to the principle that on cooling of the cable the reservoirs deliver up the impregnating oil which they have received from the main dielectric when in the heated condition.

The presence of voids or imperfect impregnation of the inner reservoir does not effect the breakdown point of the cable, because all points of this reservoir at any cross section are at the same potential.

In high tension cables working at very high potentials in which the thickness of insulation is considerable it may be advisable to incorporate one or more capillary reservoirs at points intermediate between the conductor and the sheath. In this case the active insulation would be terminated on either side by a metallized paper $g$, the metal face of which is in contact with a capillary reservoir. The situation of the reservoir would be determined by the demands made for rapid capillary replenishment by the flow of compound in the dielectric during heating cooling cycles. A cable of this character is illustrated, by way of example, in the accompanying drawing in which $a$ is the core, $b$ and $b^1$ two sections of dielectric and $c$ the lead sheath. As illustrated, an inner reservoir $d$ is disposed between the core and the inner section $b^1$ of the dielectric, an intermediate reservoir $e$ is disposed between the two sections of the dielectric and an outer reservoir $f$ is disposed between the insulation and the lead sheath.

In general the intermediate reservoir $e$ would act as a "floating" intersheath carrying a zero value of charging current but by suitable design the reservoir might be made to carry a moderate current the net charging current being that involved at the equipotential surface occupied by the reservoir, and might, if desired, be anchored by potential applied at the end of the line (e. g. by a tapping on the winding of the supply transformer). The reservoir may also be employed as a test sheath for determining the state of the dielectric from time to time.

The present invention may be applied to single core or to multi-core cables. In the so-called H type cable in which equi-potential screens at earth potential surround the dielectric of the cores and contact with the lead sheath, the employment of a metallized layer immediately surrounding the core of each conductor in combination with one or more intermediate sheaths in the form of metallized layers constructed according to the reservoir principle would improve the characteristics of the cable.

The invention is also applicable to the so-called S. L. type cable in which three separately sheathed cores are surrounded by a common armour. In such a cable an inner or core reservoir, an intermediate reservoir and an outer reservoir would be jointly used.

In a cable of the type in which three insulated cores are each provided with an equi-potential screen, the cores being encased in a triangular cross sectioned lead sheath, a large surface of the equi-potential screens engage with the inside of the lead sheath and thereby in these parts of the cable there is very little reservoir action obtained from the wormings and the efficiency of the cable may be considerably improved by employing a reservoir layer on the outside of the normal metallized screens and an inner or core reservoir and one or more intermediate reservoirs.

What is claimed is:

1. An electric cable comprising a conducting core surrounded by a body of dielectric material, an inner capillary reservoir disposed between the core and the dielectric material, one or more intermediate capillary reservoirs disposed within the body of dielectric material, and an outer capillary reservoir disposed between the dielectric and an outer cover or lead sheath.

2. An electric cable comprising a conducting core, a body of dielectric material surrounding the core, an inner capillary reservoir disposed between the core and the dielectric material, one or more intermediate capillary reservoirs disposed within the body of dielectric material, and an outer capillary reservoir disposed between the dielectric and an outer cover or lead sheath, said reservoirs comprising a metallized surface.

3. An electric cable as claimed in claim 2 in which the boundary between a capillary reservoir and the dielectric is formed of metallized paper.

4. An electric cable as claimed in claim 2 in which the boundary between the inner capillary reservoir and the conductor is formed of a folded metallized paper tape.

5. A high tension electric cable comprising a conductive core, a layer of porous metallized paper tape surrounding and in electrical contact with the core, and forming a capillary reservoir, a body of insulation surrounding said layer and wicks connecting the reservoir to the body of insulation.

THOMAS ROBERTSON SCOTT.